US012186867B2

(12) United States Patent
Radford

(10) Patent No.: US 12,186,867 B2
(45) Date of Patent: Jan. 7, 2025

(54) BRADAWL CLAMP

(71) Applicant: Sixpence Industries Ltd, Innsworth (GB)

(72) Inventor: Harry Radford, Innsworth (GB)

(73) Assignee: SIXPENCE INDUSTRIES LTD, Innsworth (GB)

( * ) Notice: Subject to any disclaimer, the term of this patent is extended or adjusted under 35 U.S.C. 154(b) by 0 days.

(21) Appl. No.: 18/138,235

(22) Filed: Apr. 24, 2023

(65) Prior Publication Data

US 2023/0339076 A1 Oct. 26, 2023

(30) Foreign Application Priority Data

Apr. 25, 2022 (GB) ...................................... 2205959

(51) Int. Cl.
*B25B 5/16* (2006.01)

(52) U.S. Cl.
CPC .................................... *B25B 5/163* (2013.01)

(58) Field of Classification Search
CPC .......... B25H 7/045; B28D 1/225; B28D 7/00; B25B 5/163; B25B 5/06; B23Q 3/06; B23Q 3/062
See application file for complete search history.

(56) References Cited

U.S. PATENT DOCUMENTS 4,198,038 A * 4/1980 Quinter .................... B23Q 3/06 269/282
4,772,000 A * 9/1988 Aubert ...................... B25B 5/06 269/254 CS
8,763,998 B1 * 7/2014 Worstell .................. B25B 5/163 269/6
8,794,609 B2 * 8/2014 Kalambokas ........... B25B 5/142 269/6
10,556,326 B1 * 2/2020 Kelly ........................ B25B 5/02
2021/0069841 A1 3/2021 Hamon et al.

FOREIGN PATENT DOCUMENTS

| | | |
|---|---|---|
| BE | 1010202 | 3/1998 |
| DE | 102004034533 | 2/2006 |
| FR | 2615888 | 12/1988 |

OTHER PUBLICATIONS

UKIPO, Search Report in corresponding GB application GB2205959.6, Oct. 21, 2022.

* cited by examiner

*Primary Examiner* — Seahee Hong
(74) *Attorney, Agent, or Firm* — Alley IP

(57) ABSTRACT

To cut or score straight lines along sheet materials such as drywall panels, insulation boards, and timber sheets, it is commonly known to use a guide rail. Guide rail attachment means include screws, clamps, and/or adhesive pads. These securing means are time consuming to implement, and can cause damage to a main face of the sheet material. The present invention provides a guide rail securing device for releasably securing a guide rail 100 to a sheet material 200, comprising a guide rail attachment mechanism, and at least one penetrating element 20 to secure the guide rail securing device to the sheet material 200 by penetrating an edge of the sheet material 200. In this way, once the guide rail securing device is securely attached to the guide rail, a user may instantly connect the guide rail to the sheet material by penetrating an edge of the sheet material with the penetrating element.

9 Claims, 6 Drawing Sheets

BRADAWL CLAMP

RELATED APPLICATIONS

This application claims priority under 35 U.S.C. § 119 to GB Application 2205959.6, filed Apr. 25, 2022, such GB Application also being incorporated by reference herein in its entirety.

FIELD

The present invention relates generally to a guide rail securing device and a method of securing a guide rail securing device and finds particular, although not exclusive, utility in securing a guide rail securing device to a sheet material.

BACKGROUND

To cut or score straight lines along sheet materials such as drywall panels, insulation boards, and timber sheets, it is commonly known to use a guide rail. Generally, guide rails comprise an elongate panel, which may include tracks formed of channels and/or grooves extending along the length of the panel. In use, the guide rail may be secured to a sheet material such that the panel is parallel to a main face of the sheet material, and a cutting or scoring tool may be connected to the tracks of the guide rail. Movement of the tool along the tracks ensures a straight cut or score line along the face of the sheet material.

Common systems for securing a guide rail to a sheet material include screwing the guide rail to a main face of the sheet material, clamping the guide rail to the sheet material, or inserting adhesive pads into holes within the guide rail to adhere to the main face. These securing means are time consuming to implement, and can cause damage to the main face of the sheet material. For example, screws may be inserted into the main face causing holes, or a clamp may be overtightened such that the main face is crushed.

Additionally, these systems work by attaching the securing means to the guide rail and the sheet material at the same time. For example, to clamp the guide rail to the sheet material, the jaws of the clamp will apply pressure to the sheet material and guide rail at the same time to secure them together. Therefore, the guide rail may need to be held in place by hand whilst the securing means is operated, which may result in the guide rail slipping out of place during attachment. This is particularly an issue if the sheet material is not lying in a horizontal plane. If the guide rail has been attached in the wrong place or is out of alignment, additional time is lost releasing the securing means. This is also a problem if the guide rail requires multiple position changes to provide multiple cuts or score lines to a sheet material.

Therefore, it is desirable to provide a means for instantly securing and releasing a guide rail to a sheet material, and without causing damage to the main face of the sheet material.

SUMMARY

In a first aspect, the present invention provides a guide rail securing device for releasably securing a guide rail to a sheet material, the guide rail securing device comprising a guide rail attachment mechanism configured to attach the guide rail securing device to a guide rail, and at least one penetrating element projecting therefrom configured to secure the guide rail securing device to the sheet material by penetrating an edge of the sheet material.

In this way, the guide rail securing device may be securely attached to the guide rail by means of the guide rail attachment mechanism, without the guide rail securing device also being attached to the sheet material. In use, the guide rail securing device may be attached to the side of the guide rail that is parallel to, and abuts, the main face of the sheet material.

Once the guide rail securing device is securely attached to the guide rail, a user may instantly connect the guide rail to the sheet material by penetrating an edge of the sheet material with the penetrating element. It will be appreciated that the action of attaching the guide rail to the sheet material is achieved without the need to actuate a mechanism or tool (for example, a clamp or screwdriver). A user may instantly disconnect the guide rail from the sheet material by simply pulling the penetrating element out of the edge of the sheet material. Again, it will be appreciated that this disconnection does not involve the actuation of a mechanism. Furthermore, because the guide rail securing device interacts with the edge surface of the sheet material and not the main face, the main face is protected from damage.

The sheet material may comprise a sheet of material having a width and/or length substantially greater than its depth. The sheet material may further comprise a main face, and a plurality of edges extending perpendicularly to the plane parallel to the main face of the sheet material. The sheet material may comprise, for example, a drywall panel, a plasterboard panel, insulation material, and/or timber boards.

The guide rail may comprise an elongate panel which may be planar. The elongate panel may be substantially rectangular, such that the edges of the elongate panel are substantially straight. However, it will be appreciated that the elongate panel may comprise other shapes. For example, the edges of the elongate panel may comprise curves or a sinusoidal shape, such that curves or sinusoidal cuts or score lines may be made to a sheet material. The guide rail may comprise at least one main surface configured, in use, to sit flush against a main face of a sheet material.

The guide rail may include tracks formed of channels and/or grooves having a longitudinal axis extending along the length of the panel. The channels and/or grooves may comprise a substantially U-shape cross-section. The channels and/or grooves may comprise a base, and two side walls extending from the base parallel to each other to form the substantially U-shape cross-section, wherein the two side walls extend perpendicularly to the plane parallel to the main surface of the guide rail. The ends of the two side walls distal from the base may each comprise a lip projecting into the channel and/or groove. The lips may project in a direction substantially parallel to the main surface of the guide rail.

The tracks may be located on one main surface of the guide rail, or on multiple main surfaces of the guide rail. For example, tracks may be located on opposite sides of the guide rail, which may be considered to be a front and back of the guide rail.

Securing the guide rail to the sheet material may comprise attaching the guide rail to the sheet material such that a main surface of the guide rail, in use, may be parallel to a main face of the sheet material. The main surface of the guide rail may sit flush against a main face of the sheet material. The guide rail may be secured to the sheet material such that only the track or tracks of the guide rail may contact the main surface of the sheet material.

Releasably securing the guide rail to the sheet material may comprise, after securing the guide rail to the sheet material, releasing the guide rail from the sheet material such that the guide rail is not secured and/or in contact with the sheet material.

The guide rail securing device may comprise a body. The guide rail attachment mechanism and the penetrating element may be connected to the body.

The guide rail attachment mechanism may comprise a system of parts working together to attach the guide rail securing device to the guide rail. The guide rail attachment mechanism may interact with a track of the guide rail, such that the interaction between the guide rail attachment mechanism and the track prevents relative movement between the guide rail securing device and the guide rail. In particular, at least a portion of the guide rail attachment mechanism may be located within the substantially U-shape of the track, and/or located in-between the two side walls of the track.

The guide rail attachment mechanism may comprise a cam. The cam may be one part of the system of parts. In use, the cam may be positionable within the U-shape of the track, and/or positionable between the two side walls of the track. The cam may comprise a cross-sectional shape having a length longer than its width, in a plane parallel to the main surface of the guide rail when in use. For example, the cross-section of the cam may be rectangular or oblong. However, it will be appreciated that other cross-sectional shapes are contemplated, for example square or circular cross-sections. The width of the cam may be greater than the distance between the distal ends of the lips extending into the track.

When the cam is configured in a first position wherein the distance between the body of the guide rail securing device and the cam is greater than the thickness of the lips in a direction normal to the surface of the guide rail, the guide rail securing device may be moveably attachable to the guide rail. In this way, the cam may be positioned within the track, and a body of the guide rail securing device may be positioned outside of the track. In particular, the cam and body may be positioned such that the lips of the track are located between the cam and body.

In this first position, the cam may not contact the inner surfaces of the lips. Furthermore, in this first position the cam may not contact the inner surfaces of the side walls of the track. Further still, the length of the cam may be substantially parallel to the longitudinal axis of the track. Any one, or all, of these configurations of the first position may allow relative movement between the guide rail securing device and the guide rail, enabling the guide rail securing device to be inserted into the track, or removed from the track. In particular, this may allow a user to slide the cam into an open end of the track, in a direction parallel to the longitudinal axis of the track. By having the width of the cam greater than the distance between the distal ends of the lips extending into the track, the guide rail securing device may be prevented from being inserted into, or removed from, the track in a direction substantially perpendicular to the main surface of the guide rail.

When the cam is configured in a second position within the track, the cam may contact the inner surfaces of the lips. In particular, the lips may be clamped between the cam and the body of the guide rail securing device, thereby preventing relative movement between the guide rail securing device and the guide rail. Furthermore, in the second position the cam may be arranged such that the length of the cam is substantially offset from the longitudinal axis of the track. The cam may be offset to such an extent that the cam contacts the inner surfaces of the side walls of the track. In this way, the likelihood of the cam sliding within the track in the second position is reduced by creating further contact points between the cam and the track.

A shaft may be a second part of the system of parts. The shaft may be rotatable within the guide rail securing device. The shaft may be located within the body of the guide rail securing device. The longitudinal axis of the shaft may, in use, extend perpendicularly to the main surface of the guide rail. The cam may be attached to an end portion of the shaft. The end portion of the shaft may comprise a thread, and this end portion of the shaft may extend through a hole within the cam. The hole within the cam may comprise a thread corresponding to the thread of the shaft.

In use, rotation of the shaft may induce movement of the cam in a direction parallel to the axis of the shaft. When the cam is in the first position, rotation of the shaft may move the cam along the shaft and towards the lips and into the second position, thereby clamping the lips between the body and cam. In this way, relative movement between the guide rail securing device and the guide rail may be prevented. When the cam is in the second position, rotation of the shaft may move the cam along the shaft away from the lips and into the first position, thereby removing the clamping force applied to the lips by the body and cam. In this way, relative movement between the guide rail securing device and the guide rail may be enabled.

Additionally, or alternatively, when the cam is in the first position, rotation of the shaft may first rotate the cam such that the cam contacts the inner surfaces of the side walls of the track. Once the cam contacts the inner surfaces of the side walls, continued rotation of the shaft may move the cam along the shaft and towards the lips and into the second position, thereby clamping the lips between the body and cam.

By having the shaft extend through the guide rail securing device, when the guide rail securing device is placed on the guide rail such that the cam is within the track, the cam may still be actuated by rotating the shaft.

The end of the shaft opposite to the cam may comprise at least one of a knob, handle, and/or ergonomic grip. The knob, handle, and/or ergonomic grip may be further part of the system of parts. This may provide a user with a convenient means for applying a rotational force to the shaft.

The end of the shaft opposite the cam may comprise a flat headed bolt, which may be a further part of the system of parts. The flat headed bolt may be connected to the shaft such that rotation of the flat headed bolt induces rotation of the shaft. A user may rotate the flat headed bolt via tools such as a screwdriver or an Allen key. A tool specifically designed to engage with a unique aperture within the flat headed bolt is also contemplated. By utilising a flat headed bolt to rotate the shaft, the guide rail securing device may have a lower profile compared to a guide rail securing device having at least one of knob, handle, and/or ergonomic grip. In this way, when the guide rail securing device utilising a flat headed bolt is connected to a track of the guide rail, the guide rail securing device may not extend a substantial distance from the distal ends of the side wall of the track. As such, relatively thin sheets of material may be cut using the guide rail. This is because, if a longer sheet of material is behind the sheet of material being cut, the guide rail securing device will not butt against the longer sheet material and prevent the guide rail from sitting flush against the sheet material being cut.

It will be appreciated that other guide rail attachment mechanisms are contemplated. For example, the guide rail attachment mechanism may comprise clamps configured to attach separately to each side wall of the track, or the guide rails securing mechanism may comprise a single clamp configured to contact outer surfaces of the side walls of the track. Alternatively, the mechanism may comprise spring loaded elements configured to contact inner surfaces of the track.

The at least one penetrating element may comprise any means for piercing the outer surface of a sheet material, such that the at least one penetrating element is at least partially embedded within the sheet material. The at least one penetrating element may comprise a proximal end configured to be connected to the guide rail securing device, and a distal end spaced from the proximal end and configured to pierce a sheet material. The diameter of the proximal end may be larger than the diameter of the distal end. The at least one penetrating element may taper from the proximal end to the distal end. Additionally, or alternatively, the surface of the at least one penetrating element may be stepped and/or tessellated from the proximal end to the distal end. Alternatively, the diameter of the at least one penetrating element may be substantially uniform from the proximal end to the distal end. The at least one penetrating element may be provided with a sharp point at the distal end that may easily penetrate a material, even a relatively hard material such as wood. The at least one penetrating element may alternatively be provided with a rounded or blunt distal end.

The at least one penetrating element may, for example, comprise at least one of a spike, a needle, an awl, a bradawl, a prong, and/or a piercing means.

The at least one penetrating element projecting from the guide rail securing device may comprise the at least one penetrating element extending from an outer surface of the guide rail securing device. The at least one penetrating element may be integrally formed with the guide rail securing device, or the guide rail securing device and the at least one penetrating element may be formed of separate parts. The at least one penetrating element may be removable from the guide rail securing device. Additionally, and/or alternatively, the at least one penetrating element may be retractable within the guide rail securing device, and/or may comprise a removable cover.

In use, the at least one penetrating element may extend from the guide rail securing device in a direction substantially parallel to the longitudinal axis of the track. The at least one penetrating element may project from the guide rail securing device such that, when the guide rail securing device is attached to a guide rail, the at least one penetrating element is angled away from the guide rail. The angle may be between 0 degrees and 10 degrees, preferably 2 degrees. Angles outside of this rage are also contemplated. Having the at least one penetrating element angled away from the guide may act to pull the guide rail and sheet material together. In this way, the contact friction between the guide rail and sheet material may be increased, relative movement between the guide rail and sheet material may be reduced, and stability of the guide rail may be improved. Alternatively, the penetrating element may be angled towards the guide rail, in use.

The device may comprise one penetrating element, or a plurality of penetrating elements, projecting from the guide rail securing device. A plurality of penetrating elements may further improve the stability of the guide rail and reduce relative movement between the guide rail and sheet material. For example, providing a plurality of penetrating elements may prevent rotation of the device around a single penetrating element. Additionally, or alternatively, using a plurality of penetrating elements may enable each penetrating element to penetrate the sheet material at a shorter depth than a single penetrating element, and still provide the same level of securement.

In a second aspect, the invention provides a method for releasably securing a guide rail to a sheet material, the method comprising the steps of providing the guide rail securing device of the first aspect, attaching the guide rail securing device to a guide rail via the guide rail attachment mechanism, and penetrating the edge of the sheet material with the at least one penetrating element to releasably secure the guide rail to the sheet material.

In a third aspect, the invention provides a guide rail securing system for securing a guide rail to a sheet material, the system comprising a guide rail and the guide rail securing device of the first aspect.

The guide rail securing system may further comprise a second guide rail securing device.

In this way, two guide rail securing devices may be used as a pair, such that a sheet material is clamped between two guide rail securing devices penetrating opposite edge surfaces of the sheet material. In this configuration, a first guide rail securing device may be secured to a guide rail via its guide rail attachment mechanism, enabling the guide rail to be secured to a first edge of the sheet material via the at least one penetrating element. The second guide rail securing device may then be separately located in a track in the guide rail, such that a user may slide the second guide rail securing device along the track and penetrate a second edge of the sheet material, opposite the first edge, with the at least one penetrating element of the second guide rail securing device. Once the second guide rail securing device has penetrated the second edge of the sheet material, the guide rail attachment mechanism of the second guide rail securing device may be actuated to lock the second guide rail securing device to the guide rail, thereby preventing relative movement between the second guide rail securing device and the guide rail.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
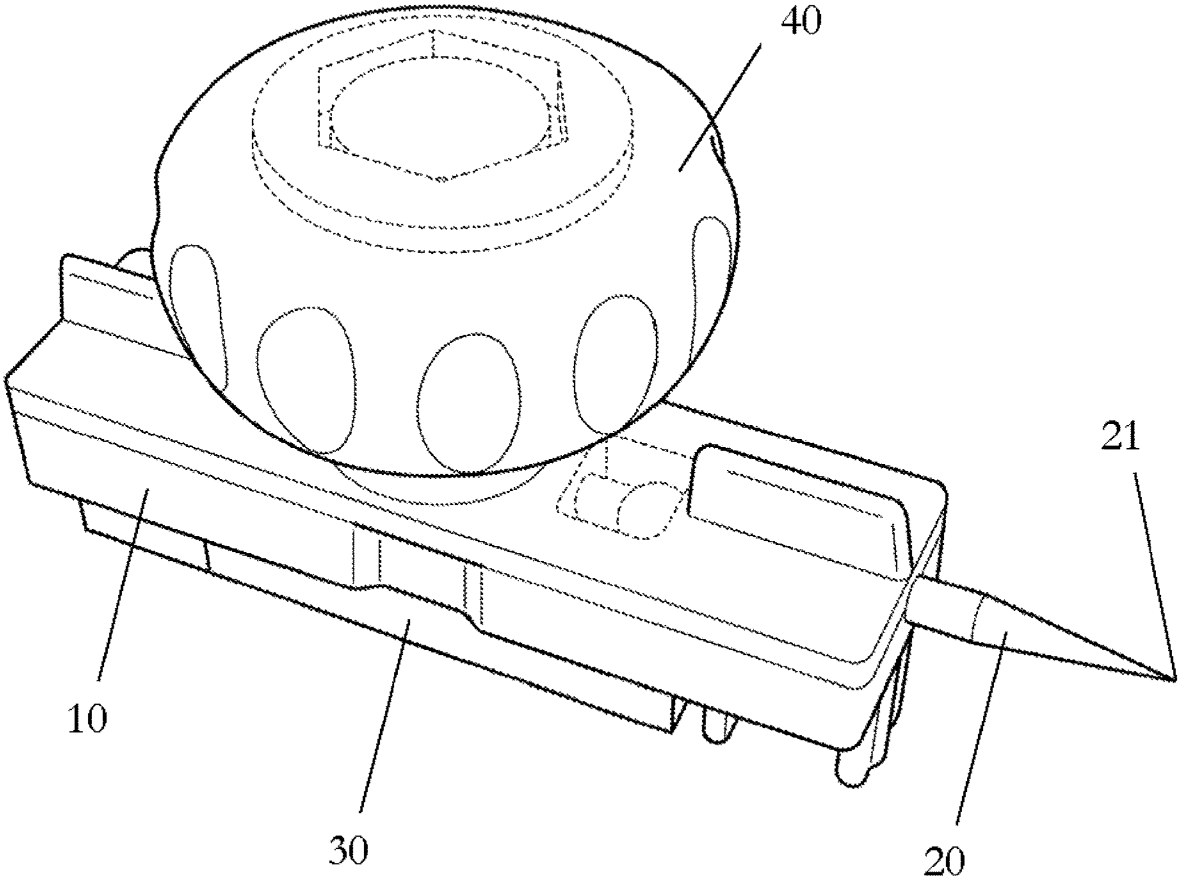
FIG. 1 is a perspective view of a guide rail securing device.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term “comprising”, used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression “a device comprising means A and B” should not be limited to devices consisting only of components A and B. It means that with respect to the present invention, the only relevant components of the device are A and B.

Reference throughout this specification to “an embodiment” or “an aspect” means that a particular feature, structure or characteristic described in connection with the embodiment or aspect is included in at least one embodiment or aspect of the present invention. Thus, appearances of the phrases “in one embodiment”, “in an embodiment”, or “in an aspect” in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term “at least one” may mean only one in certain circumstances. The use of the term “any” may mean “all” and/or “each” in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a perspective view of a guide rail securing device. The guide rail securing device comprises a body 10. The body 10 may be a central block to which further components of the guide rail securing device may be attached. The body 10 may be hollow or substantially solid, and may be formed of a single part, or may be formed of multiple parts connected together. The body 10 may be substantially cuboidal, however other shapes are also contemplated. For example, the body 10 may be a prism having a triangular, pentagonal, or hexagonal cross-section, or any other 3-dimensional shape. The body 10 has a longitudinal axis that, in use, may be parallel to a longitudinal axis of a track of a guide rail. The body 10 may comprise plastics, metal, wood, ceramic and/or carbon/glass fibres.

The guide rail securing device further comprises a penetrating element 20. The penetrating element 20 may be attached to an outer surface of the body 10. The penetrating element 20 may be embedded within the body 10, such that the penetrating element 20 protrudes out of the body 10. Further still, the penetrating element 20 may be connected to a mechanism (not shown) enabling the penetrating element 20 to be retracted into or extended from the body 10. In this way, the risk of the penetrating element 20 injuring a user or damaging sheet materials when not in use may be reduced.

Figure 4:
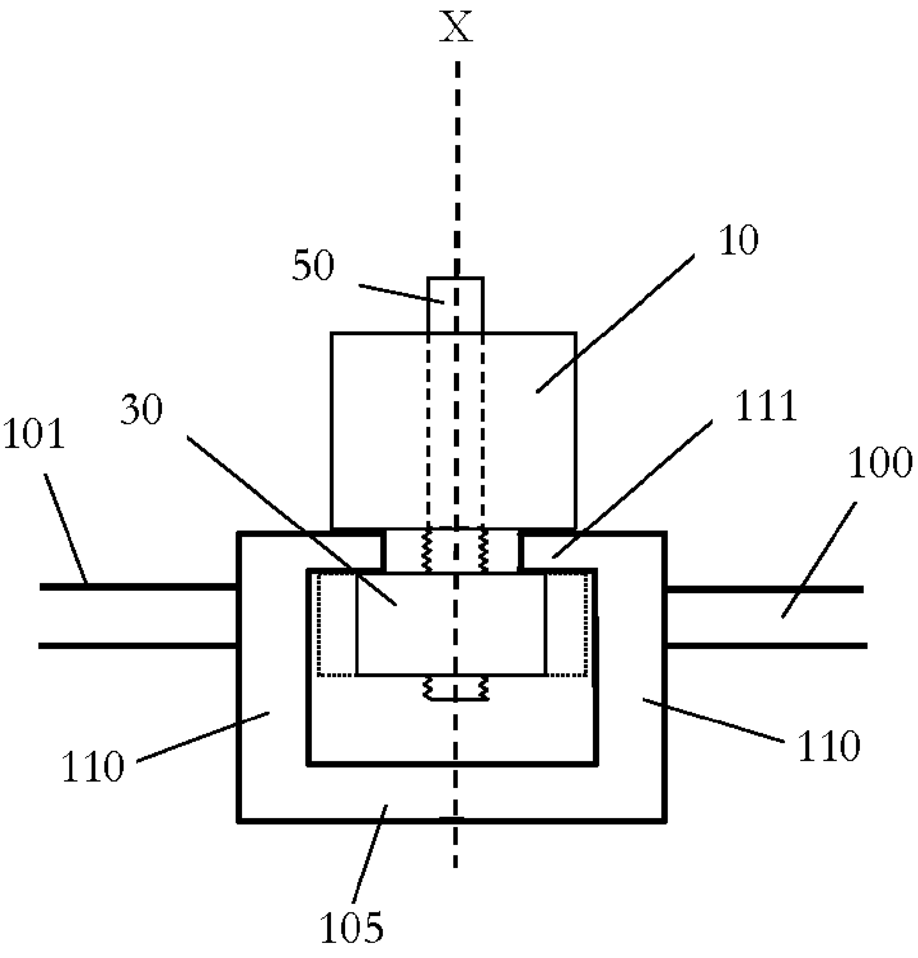
FIG. 4 is a schematic cross-sectional view of a guide rail securing device located within a track of a guide rail when the cam is in a second position.

The penetrating element 20 may extend substantially parallel to the longitudinal axis of the body 10, or the penetrating element 20 may extend away from the longitudinal axis at an angle A (as show in FIG. 4). In use, this may result in the penetrating element 20 extending away from the guide rail, although it will be appreciated that the penetrating element 20 extending towards the guide rail is also envisaged. The angle A may be between 0 degrees and 10 degrees, and preferably 2 degrees. It will be appreciated that angles outside of this range are also contemplated.

The penetrating element 20 comprises a distal end 21 that, in use, is configured to penetrate a sheet material. For example, the penetrating element 20 may comprise a spike, a needle, an awl, a bradawl, a prong, and/or a piercing means.

Figure 2:
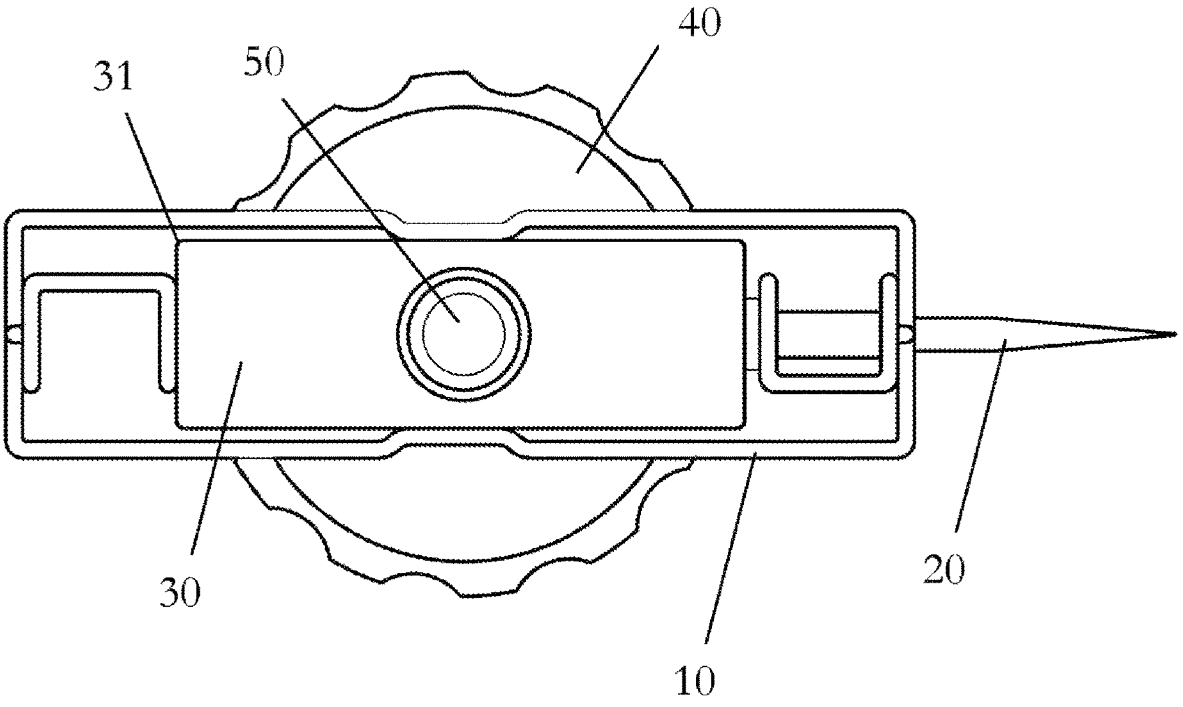
FIG. 2 is a view of a guide rail securing device comprising a cam.

Referring also to FIG. 2, the guide rail securing device further comprises a guide rail attachment mechanism comprising a cam 30, a knob 40, and a shaft 50. The shaft 50 extends through the body 10 at an angle perpendicular to the longitudinal axis of the body 10, and the cam 30 is connected to a first end of the shaft 50. The knob 40 is connected to a second end of the shaft 50. In use, rotation of the knob 40 may rotate the shaft 50, which in turn may move the cam 30 in a direction parallel to the axis of the shaft 50.

The cam 30 comprises a rectangular cross-section, although it will be appreciated that other shapes are also contemplated. For example, the cam 30 cross-section may comprise other oblong shapes such as an oval. The first end of the shaft 50 extends through substantially the centre point of the cam 30. However, it is also contemplated that the shaft 50 extends through a point offset from the centre point of the cam 30.

Figure 3:
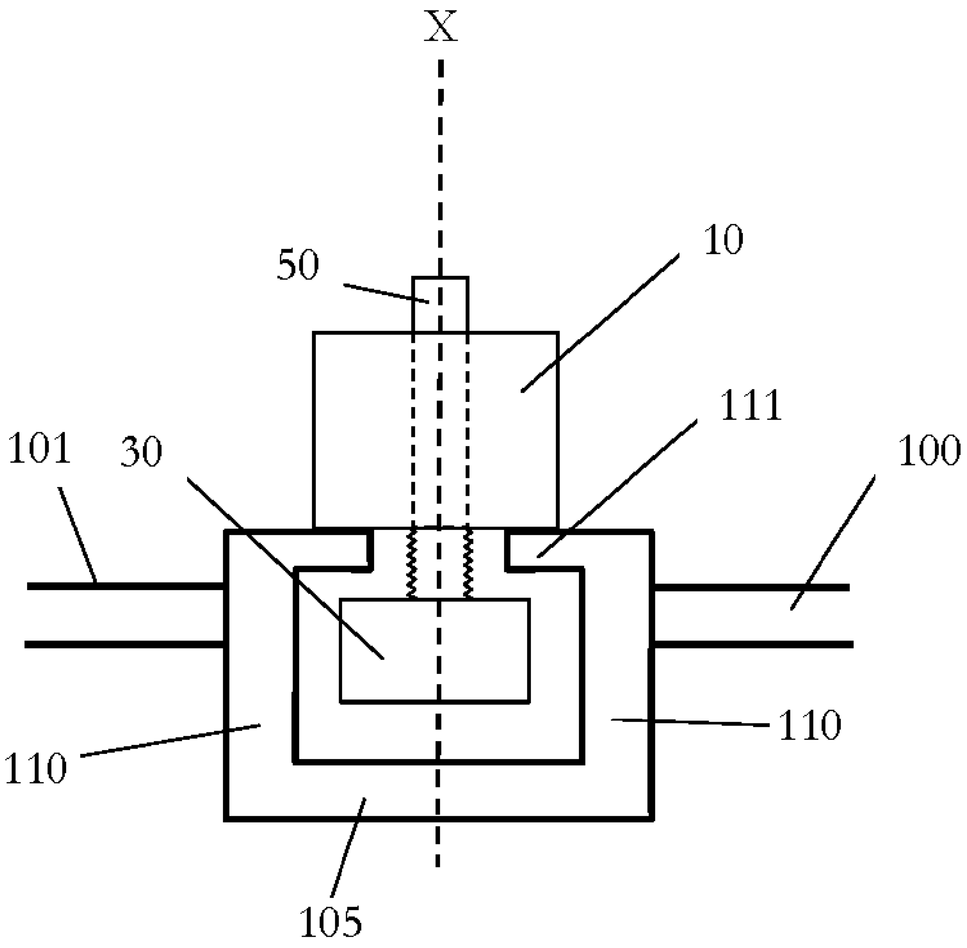
FIG. 3 is a schematic cross-sectional view of a guide rail securing device located within a track of a guide rail when the cam is in a first position.

FIGS. 3 and 4 are schematic cross-sectional views of a guide rail securing device within a track of a guide rail 100. The guide rail 100 may comprise an elongate panel, and the orientation is such that the elongate panel extends out of the page. The track extends along the length of the elongate panel, and therefore also extends out of the page. Tracks may be located on both sides of a guide rail, or only one side of a guide rail. The track comprises a base 105, and two side walls 110 extending from the base 105 parallel to each other, the side walls 110 extending perpendicularly to the plane of a main surface 101 of the guide rail 100.

The side walls 110 further comprise lips 111, extending from a distal end of the walls in a direction substantially parallel to the plane of the main surface 101 of the guide rail 100. The distance between the distal ends of the lips 111 may be less than the width of the cam 30, taken in a direction parallel to the plane of the main surface 101 of the guide rail 100.

FIG. 3 shows a first position of the cam 30. In this first position, the cam 30 does not contact the inner surfaces of the side walls 110, nor the inner surfaces of the lips 111. The longitudinal axis of the cam 30 is also substantially parallel to the longitudinal axis of the track. When the cam 30 is in the first position, the guide rail securing device may be inserted or removed from the track of the guide rail 100. In particular, the cam 30 of the guide rail securing device may slide into the track in a direction parallel to the longitudinal axis of the track (i.e. into the page in FIG. 3).

The solid line depicting the cam 30 in FIG. 4 shows a second position of the cam 30. In this second position, the cam 30 contacts the inner surface of the lips 111. Furthermore, the body 10 and the cam 30 clamp the lips 111 therebetween. In use, when the cam 30 is in the second position, the guide rail securing device is secured to the track of the guide rail 100, and by extension secured to the guide rail 100. In this way, relative movement between the guide rail securing device and the track is prevented. In particular, the guide rail securing device is prevented from sliding within the track.

The first end of the shaft 50 comprises a thread, which corresponds to a thread within a hole (not shown) passing through the cam 30.

The cam 30 is moved from the first position to the second position, and vice versa, by rotation of the shaft 50 around a central axis X of the shaft 50. This may be achieved by rotating the knob 40 (not shown in FIG. 3) around the central axis X.

When the cam 30 is in the first position (FIG. 3), rotating the shaft 50 in a first direction (for example, clockwise) will cause the cam 30 to move away from the surface 101 of the guide rail 100 and towards the inner surface of the lips 111, along the central axis X. The rotation may continue until the cam 30 is in its second position.

When the cam 30 is in the second position (FIG. 4), rotating the shaft 50 in a second direction (for example, anti-clockwise) will cause the cam 30 to move towards the surface 101 of the guide rail 100 and away from the inner surface of the lips 111, along the central axis X. The rotation may continue until the cam 30 is in its first position.

Alternatively, or additionally, the dashed line in FIG. 4 depicting the cam 30 shows another arrangement of the second position wherein, in use, an initial rotation of the shaft 50 will cause the cam 30 to rotate until it contacts the inner surfaces of the side walls 110. Once the cam 30 contacts the side walls 110, continued rotation of the shaft 50 will cause the cam to move away from the surface 101 of the guide rail 100 and towards the inner surface of the lips 111, along the central axis X. The rotation may continue until the lips 111 are securely clamped between the body 10 and cam 30.

Figure 5:
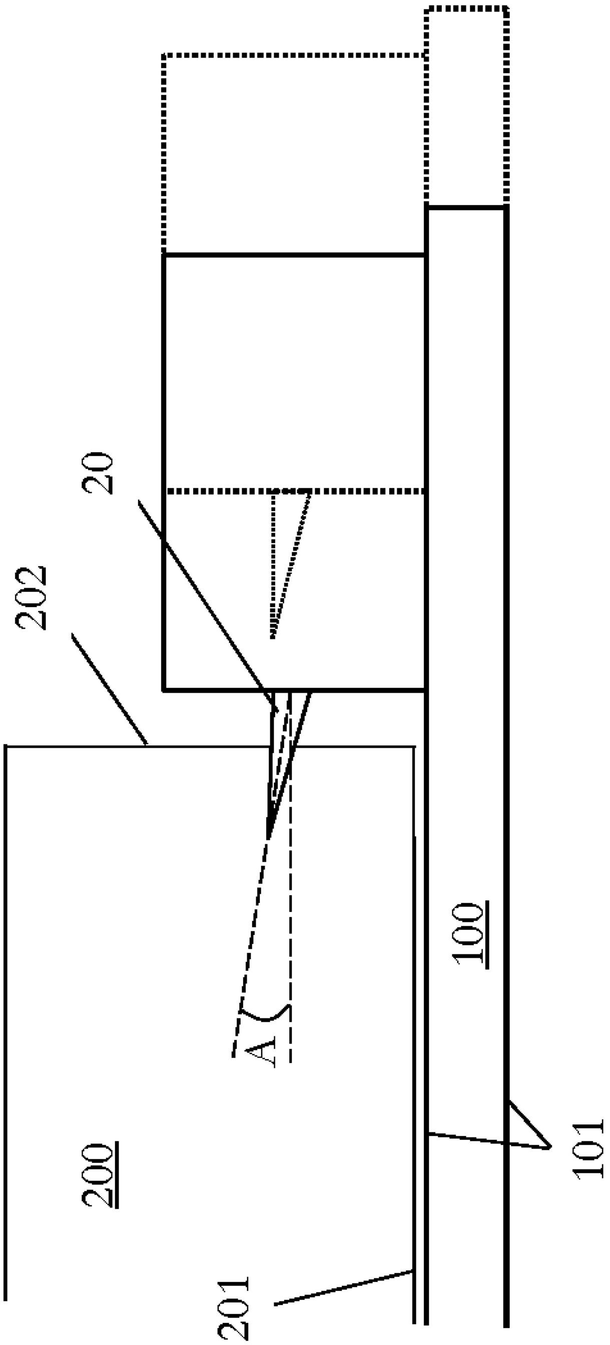
FIG. 5 is a schematic diagram showing a guide rail secured to a sheet material, and released from a sheet material.

FIG. 5 is a schematic diagram showing the guide rail securing device being secured to and released from a sheet material 200. The sheet material 200 comprises a main face 201, and an edge 202 defined by a surface extending substantially perpendicularly to the plane parallel to the main face 201. It will be appreciated however that the edge 202 of the sheet material 200 may be any other angle which is not perpendicular to this plane, but the following method may still be applied.

The guide rail 100 comprises a main surface 101. For ease of understanding, the track of the guide 100 has been omitted, but it will be appreciated that the guide rail securing device is secured to the guide rail 100 such that there is no relative movement between the guide rail securing device and the guide rail 100.

In use, and once the guide rail securing device has been secured to the guide rail 100, the guide rail 100 is positioned such that the main face 201 of the sheet material 200 is substantially parallel to the main surface 101 of the guide rail 100. The main face 201 may be flush against the main surface 101. Further, the portion of the guide rail 100 on which the guide rail securing device is located extends beyond the edge 202 of the sheet material 200 in a direction parallel to the plane of the main surface 101. In this way, the guide rail securing device may be located adjacent to an edge 202 of the sheet material 200 such that the penetrating element 20 extends towards the surface of the edge 202, and the distal end 21 is proximate to the surface of the edge 202. This is illustrated in FIG. 5 by the dashed lines outlining the guide rail securing device.

A user may then move or slide the guide rail 100 such that the distal end 21 of the penetrating element 20 pierces the surface of the edge 202, thereby penetrating the sheet material 200. Once the penetrating element 20 is embedded within the sheet material 200, the guide rail 100 is secured to the sheet material 200. This is illustrated in FIG. 5 by the solid lines outlining the guide rail securing device.

When the guide rail 100 is secured to the sheet material 200, the user may then orient the guide rail 100 with one hand to align an edge of the guide rail 100 to a desired position extending across the main face 201 of the sheet material 200, and with their other hand run a scoring or cutting tool along the edge of the guide rail 100 to cut or score the sheet material 200.

To release the guide rail 100 from the sheet material 200, the user may merely move or slide the guide rail 100 in a direction away from the surface of edge 202 such that the penetrating element 20 is withdraw from the material 200.

Figure 6:
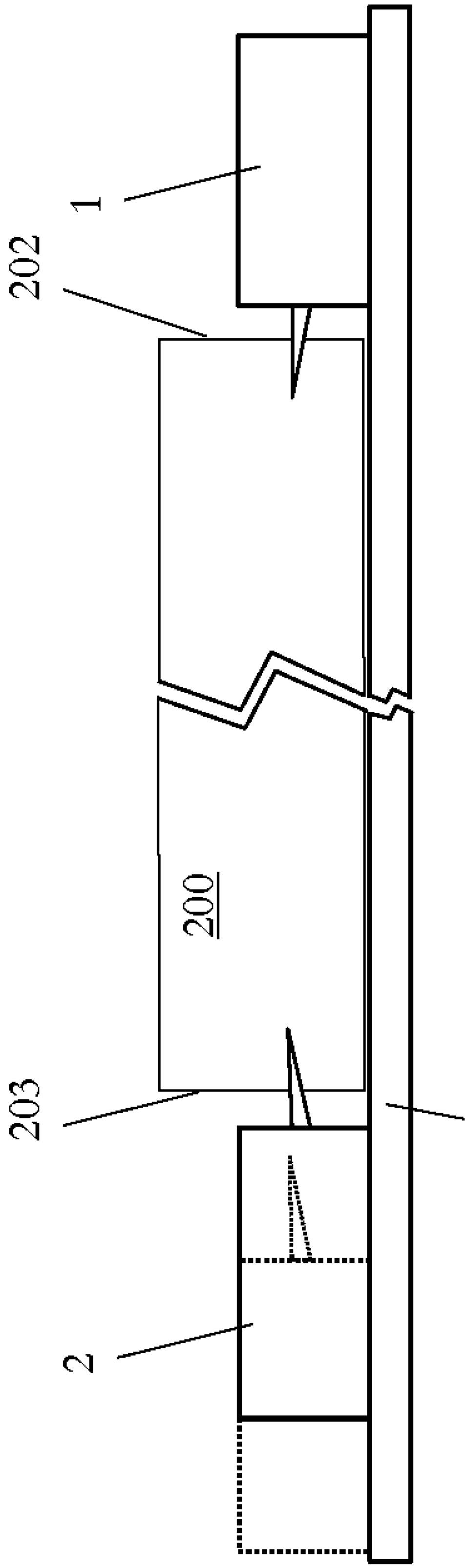
FIG. 6 is a schematic diagram showing two guide rail securing devices engaged with a sheet material.

FIG. 6 is a schematic diagram showing two guide rail securing devices 1, 2 engaging with a sheet material. In use, the first guide rail securing device 1 is attached to a track of the guide rail 100 and secured to a first edge 202 of the sheet material 200 via the apparatus and method detailed above.

The user then aligns the guide rail 100 across the main face 201 of the sheet material 200 in a desired position, and locates the second guide rail securing device 2 in a track of the guide rail 100. This track may not be the same track that the first guide rail securing device 1 is attached to, it need only be a track on the same main surface 101. Once the second guide rail securing device is located in a track, the user may slide the second guide rail securing device 2 along track until the penetrating element of the second guide rail securing device penetrate a second edge 203 of the sheet material 200. After the penetrating element 20 of the second guide rail securing device 2 is embedded in the second edge 203, the user may secure the second guide rail securing device 2 to the guide rail 100 by actuating the guide rail attachment mechanism of the second guide rail securing device 2. In this way, the guide rail 100 may be secured to two edges 202, 203 of the sheet material 200, such that the user is not required to support either end of the guide rail 100. This enables a guide rail to remain secured to a sheet material without further input by a user.

The invention claimed is:

1. A guide rail securing device for releasably securing a guide rail to a sheet material, the guide rail securing device comprising:

a guide rail attachment mechanism configured to attach the guide rail securing device to the guide rail by interacting only with a track located on a main face of the guide rail, wherein at least a portion of the guide rail attachment mechanism is located in-between two side walls of the track, and wherein the guide rail attachment mechanism is further configured to allow the guide rail securing device to be attached to, and removed from, the track of the guide rail; and at least one penetrating element projecting therefrom configured to secure the guide rail securing device to the sheet material by penetrating an edge of the sheet material, wherein the at least one penetrating element projects from the guide rail securing device such that, when the guide rail securing device is attached to the guide rail, the penetrating element is angled away from the guide rail.

2. The guide rail securing device of claim 1, wherein the penetrating element comprises at least one of a spike, a needle, an awl, a bradawl, a prong, and/or a piercing means.

3. The guide rail securing device of claim 1, wherein the guide rail attachment mechanism comprises a cam.

4. The guide rail securing device of claim 3, wherein the cam is attached to an end of a shaft extending through the guide rail securing device, and wherein rotation of the shaft moves the cam along the shaft.

5. The guide rail securing device of claim 4, wherein the end of the shaft opposite to the cam comprises at least one of a knob, handle, and/or ergonomic grip.

6. The guide rail securing device of claim 4, wherein the end of the shaft comprises a flat headed bolt.

7. A method for releasably securing a guide rail to a sheet material, the method comprising the steps of:

providing the guide rail securing device of claim 1;

attaching the guide rail securing device to the guide rail via the guide rail attachment mechanism, wherein the guide rail attachment mechanism is configured to attach the guide rail securing device to the guide rail by interacting only with the track located on the main face of the guide rail, and wherein at least the portion of the guide rail attachment mechanism is located in-between the two side walls of the track; and penetrating the edge of the sheet material with the at least one penetrating element to releasably secure the guide rail to the sheet material, wherein the at least one penetrating element projects from the guide rail securing device such that, when the guide rail securing device is attached to the guide rail, the penetrating element is angled away from the guide rail.

8. A guide rail securing system for securing the guide rail to the sheet material, the system comprising the guide rail and the guide rail securing device of claim 1.

9. The guide rail securing system of claim 8, further comprising a second guide rail securing device.

* * * * *